United States Patent [19]

Gyugyi

[11] 3,999,112
[45] Dec. 21, 1976

[54] POLYPHASE FREQUENCY CONVERTER

[75] Inventor: Laszlo Gyugyi, Pittsburgh, Pa.

[73] Assignee: Westinghouse Electric Corporation, Pittsburgh, Pa.

[22] Filed: May 8, 1975

[21] Appl. No.: 575,887

[52] U.S. Cl. .................................. 321/7; 321/26; 321/69 R
[51] Int. Cl.² ........................................ H02M 5/27
[58] Field of Search .................. 321/7, 26, 69 R

[56] References Cited

UNITED STATES PATENTS 3,707,665  12/1972  Gyugyi ..................... 321/69 R X
3,777,250  12/1973  Kaeser et al. ............. 321/69 R X Primary Examiner—William M. Shoop
Attorney, Agent, or Firm—C. M. Lorin

[57] ABSTRACT

The interphase reactors of an unrestricted static frequency changer are mounted on a common multilegged magnetic core without affecting the individual quality of each reactor in the operation of the frequency changer.

1 Claim, 8 Drawing Figures

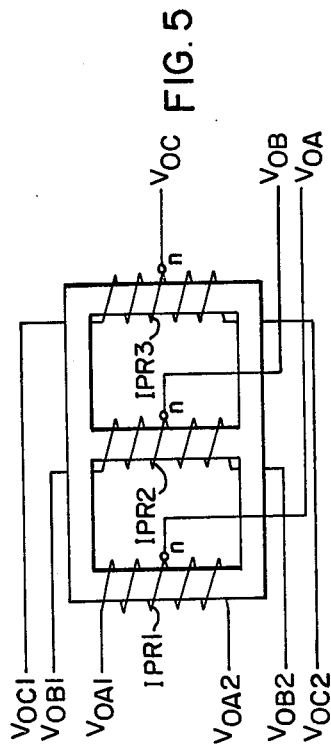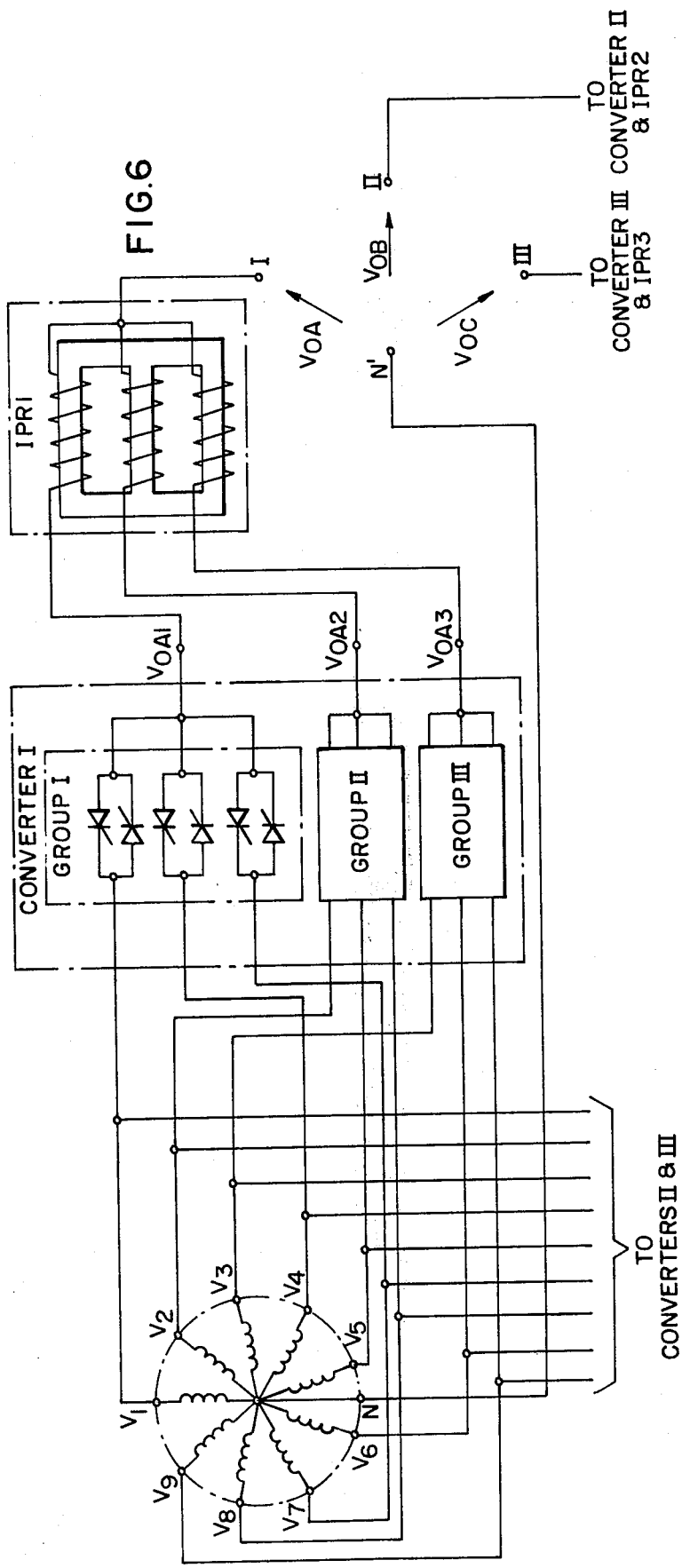

POLYPHASE FREQUENCY CONVERTER

BACKGROUND OF THE INVENTION

The present invention relates to frequency converters in general, and more particularly to static frequency changers in which the grouping of electronic power switches requires the use of interphase reactors.

The invention will be described in the context of an unrestricted frequency changer. A typical unrestricted frequency changer (UFC) has been described in U.S. Pat. No. 3,170,107 of R. D. Jessee.

The unrestricted frequency changer can be defined as a converter in which a plurality of controlled bilateral switches are operated in a repetitive switching pattern at a chosen repetition rate to apply successive increments of alternating voltages from a polyphase source to an output circuit to provide an output frequency which is a function of the difference between the input frequency and the repetition rate of switching. The switches are turned ON at a selected time and are turned OFF at a chosen time the latter being varied to change the conduction duty cycle of each bilateral switch so as to vary the output voltage of the frequency changer. The said selected time and chosen time are both varied concurrently so that the conduction duty cycle be varied as a function of the output frequency.

The unrestricted frequency changer (UFC) is a most desirable power conversion system since it affords the possibility of generating any frequency output for any frequency of the input supply by merely varying the rate of switching within the converter. Another desirable feature resides in that the input phase angle of an UFC is always the opposite of the output phase angle. Therefore, if the load is inductive at the output, capacitive load will appear at the input, and vice versa.

It is common practice with polyphase systems to divide the switches into separate groups relative to a common output phase, in order to be able to lengthen the time of conduction for the same current capability of the switch, thereby to increase the output of power at the common output. When this is done an interphase reactor is generally required for combining the current paths in the groups of switches and for outputting the total load current with less distortion. It is generally known in frequency converters, as well as in DC rectifier circuits, to use interphase reactors for that purpose. Interphase reactors are particularly advantageous in cycloconverters since these often combine several converters of banks of thyristors.

Cycloconverters are used for their low weight as airborne power generating systems where six-, nine-, or twelve-phase input power can be directly generated by appropriate alternators which readily allow the combination of a number of basic power circuits to reduce the ripple voltages in the output and thus to decrease the size of the output filter. Interphase reactors are typically shown in U.S. Pat. No. 3,431,483 of D. L. Lafuze. In all prior art arrangements, since each output phase must be derived independently from the other output phases, the interphase reactors are generally mounted on separate magnetic cores, one for each output phase.

In a polyphase system of this sort, the magnetic core of the interphase reactor represents weight and cost. This is particularly disadvantageous when the frequency changer is to be airborne.

The main object of the present invention is to widen the field of application of static frequency changers.

Another object of the present invention is to provide a novel and improved unrestricted frequency changer;

Still another object of the present invention is to provide a polyphase converter system of reduced weight and cost.

SUMMARY OF THE INVENTION

The present invention relates in general to frequency converters in which an array of electronic bilateral power switches passes current selectively from multiphase inputs to at least one output phase, and more particularly to a cycloconverter of this type in which an interphase reactor is used between two groups of power switches in order to be able to operate the switches during a time of conduction while accommodating a maximum current within the capability of the power switches.

The invention finds a typical application in cycloconverters which convert a multiphase input power into a three-phase output power. This type of cycloconverter characteristically comprises three separate individual power circuits each supplying one of the output phases. The three-phase cycloconverter thus can be considered as three separate single phase converters operated from a common power source and controlled so that each provides one output voltage with the appropriate phase. Conventionally, each converter has its own separate interphase reactor. It is the gist of the present invention to combine such separate interphase reactors of the three converters into a single multilegged core having the appropriate number of windings. This technique can result in appreciable weight and size savings and therefore its application is particularly advantageous in airborne generating systems.

The invention is described secifically in the context of a six-phase input three-phase output system. It is understood, however, that similar treatment of separate interphase reactors is applicable to systems having a higher number of input phases. This technique can also be applicable to naturally commutated cycloconverters provided special operating conditions are respected.

More generally, the invention resides in apparatus for linking a multiphase input alternating current power supply to an alternating current power output consisting of at least two phases, with at least two groups of electronic bilateral power switching devices per phase, the switching devices of a group being each operatively connected between corresponding input phases and the output for the common phase with the provision of the interphase reactors each combining the currents to and from the power switching devices of different groups of a common phase, and with the provision of a multilegged magnetic core supporting each interphase reactor and operative in common with all the groups.

The invention also resides in a frequency converter system comprising a polyphase voltage source, at least a first and second converter, each of said converters generating at least two output waveforms, first and second output terminals associated with said first and second converters respectively, at least first and second interphase reactor means each operative to combine the output waveforms of a corresponding one of said first and second converters and having a center tap for supplying a corresponding one of said output terminals with power from said voltage source, wherein said first and second interphase reactor means are mounted on a common magnetic core.

BRIEF DESCRIPTION OF THE DRAWINGS

FIG. 5 shows a typical three-limb magnetic core than can be used in the frequency changer of FIG. 1;

FIG. 6 shows a nine-phase-unrestricted frequency changer;

THE PREFERRED EMBODIMENT

Figure 1:
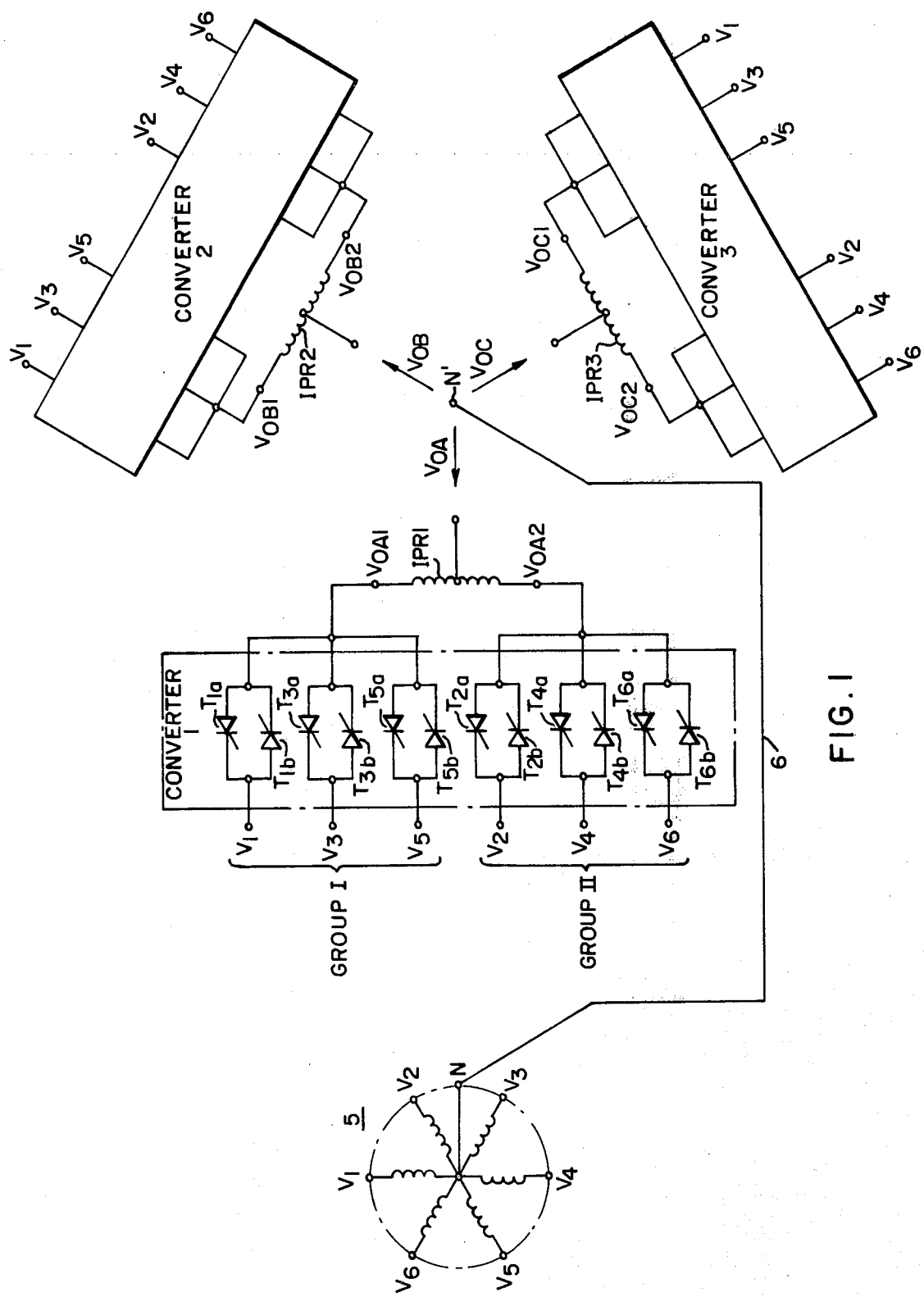
FIG. 1 shows a three-phase unrestricted frequency changer operated from a six-phase power supply.

FIG. 1 shows a three-phase unrestricted frequency changer (UFC) operated from a six-phase generating unit 5. The six phases have respective voltage terminals $V_1 - V_6$ exhibiting a phase voltage relative to an input neutral terminal N.

A neutral line 6 is connected to a neutral output terminal N'. Each of the input terminals is connected to one of three converters 1, 2, 3 symmetrically spaced about the neutral output terminal N'. Each converter consists of two groups of three bilateral semiconductor switches, one group being connected to input phase terminals $V_1$, $V_3$, $V_5$, the second group to input phase terminals $V_2$, $V_4$, $V_6$. For the purpose of illustration, only thyristors $T_{1a}$, $T_{1b}$, $T_{3a}$, $T_{3b}$ - - - $T_{6a}$, $T_{6b}$ of converter 1 are shown in FIG. 1.

The three output terminals are $V_{oA}$, $V_{oB}$ and $V_{oC}$ for the respective converters 1, 2, 3. Each group of three switches in one converter has its own output terminal $V_{oA1}$, $V_{oA2}$, $V_{oB1}$, $V_{oB2}$ or $V_{oC1}$, $V_{oC2}$, and each converter has an interphase reactor (IPR$_1$, IPR$_2$ or IPR$_3$) in common with the two groups of three switches and connected to one of the output phases $V_{oA}$, $V_{oB}$ or $V_{oC}$.

With such arrangement, the two groups of three bilateral switches are sequentially controlled for conduction so as to connect the three-phase load supplied with voltages $V_{oA}$, $V_{oB}$, $V_{oC}$ as the output terminals, to the six-phase power source 5 ($V_1 - V_6$) via interphase reactors IPR$_1$, IPR$_2$, IPR$_3$. Each bank of two groups of switches, each group being connected to alternate phases wherein group I relates the odd phase and group II relates to the even phases, can be considered as a basic converter fabricating two output waveforms which are applied to the respective inputs of the associated interphase reactor. At the output $V_{oA}$, $V_{oB}$ or $V_{oC}$ of the interphase reactor (IPR$_1$, IPR$_2$ or IPR$_3$) the arithmetic mean of the two waveforms so fabricated is obtained.

Figure 2:
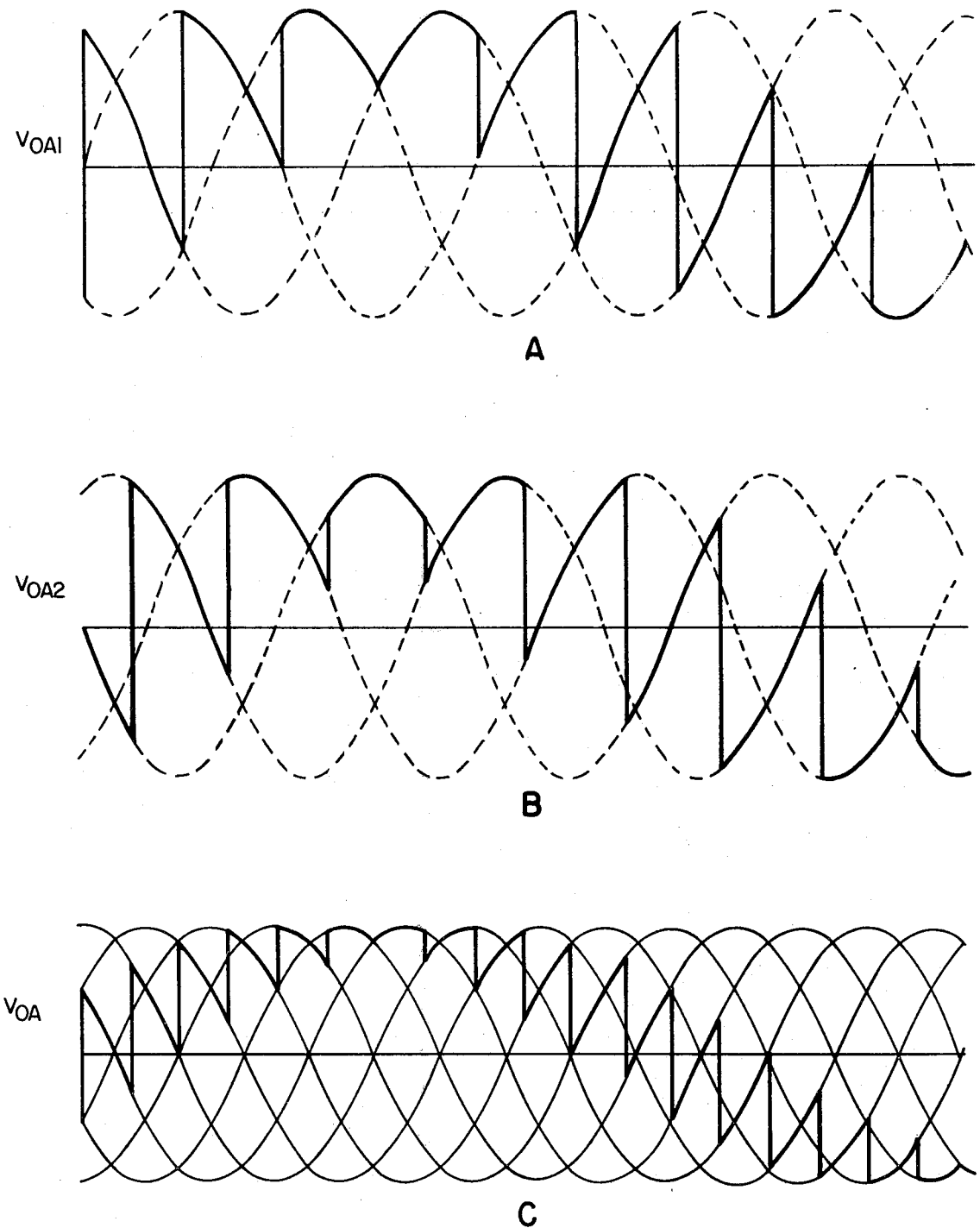
FIG. 2 illustrates voltage waveforms developed in the windings of an interphase reactor in the frequency changer of FIG. 1.

FIG. 2 represents three voltage waveforms A, B, C developed in the windings of the interphase reactor IPR$_1$. Similar waveforms phase shifted by 120° and 240°, respectively, are developed in the windings of reactors IPR$_2$ and IPR$_3$. Curves A and B represent the waveforms $V_{oA1}$, $V_{oA2}$ developed by the two groups of three thyristors in the windings of an interphase reactor (IPR$_1$). Curve C represents $V_{oA} = V_{oA1} + V_{oA2}/2$ which is the waveform developed at the center tap of the reactor supplying the load. The load current supplied at the center tap of the reactor is twice the current flowing through each of the two windings.

As can be seen from FIG. 2, the average voltage for the two inputs of the interphase reactor is the same. However, the instantaneous value of the two waveforms produced by the basic three-pulse converter, that is, by a group of three bilateral switches, is not the same. Therefore, such instantaneous voltage differences must be absorbed by the interphase reactor in order to avoid interaction between the two converters. An interphase reactor is basically designed so as to support the volt-second products corresponding to the instantaneous voltage differences appearing across its windings. The shaded areas shown in FIG. 3 represent the volt-second products absorbed by each of the two windings.

Figure 3:
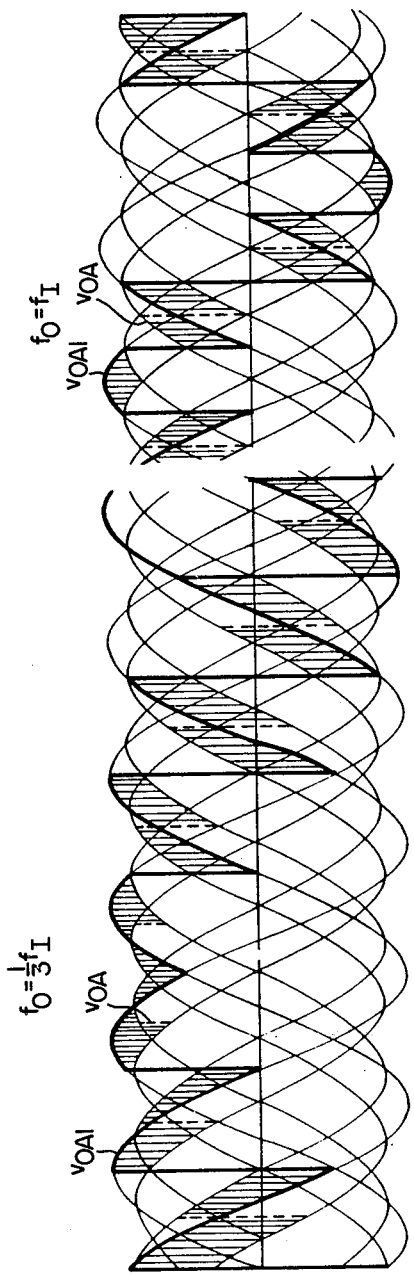
FIG. 3 shows the volt-second products absorbed by each winding of the interphase reactor for two different input-to-output frequency ratios.

One of the curves illustrated in FIG. 3 as delineating the shaded areas is one of the two curves (A) of FIG. 2, while the second delineating curve is C of FIG. 2. These shaded areas are thus valid for one winding of IPR$_1$, IPR$_2$ or IPR$_3$ of FIG. 1. A similar information can be derived for the other winding by selecting the opposite curve (B), and also using curve C. For the purpose of illustration FIG. 3 is a composite representation of the volt-second products absorbed by each winding of the interphase reactor for two conditions of operation, e.g., for two selected rates of switching of the thyristors: $f_o = 1/3 f_I$ is the condition used for the curves on the left of FIG. 3; $f_o = f_I$ is the condition for the right side of FIG. 3.

Figure 4:
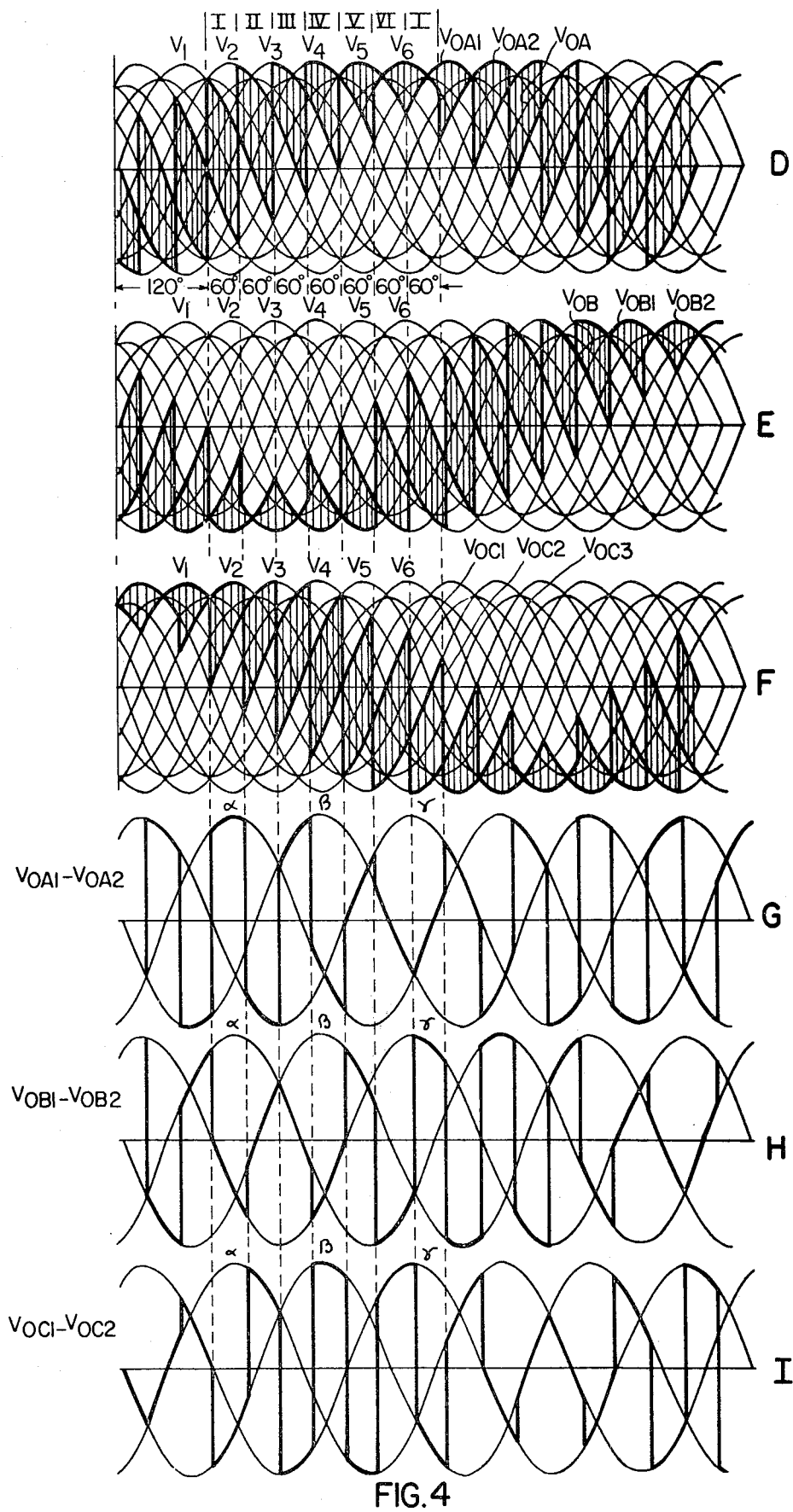
FIG. 4 illustrates with waveforms how the volt-second product curves of three reactors combine to form a balanced system.

If we add the volt-second product absorbed for each winding the volt-second product supported by the magnetic core common to the two-windings of the interphase reactor is obtained. Curves such as D, E and F, in FIG. 4, are such volt-second product curves for the three reactors. These three curves when taken together provide a representation of the magnetic condition of the cores of the three interphase reactors for the complete three-phase system. It appears from these curves that the sum of the voltages appearing across the windings of the three interphase reactors is zero at any given time. As a result, the possibility exists of combining the windings of all three interphase reactors on a single three-legged core without affecting independent operation of each reactor. This can be proven mathematically as follows:

Referring to FIG. 4 in which the voltages across the interphase reactors between two successive switching instants are plotted, the voltage difference across interphase reactor IPR$_1$ during the interval I is:

$$V_I[\sin \theta_I - \sin (\theta_I + 60°)] = V_I \sin(\theta_I - 60°)$$

where $V_I$ is the amplitude of the input voltage and $\theta_I = \omega_I t = 2\pi f_I t$, $f$, being the frequency at the input, $t$ being time.

The voltages across IPR$_2$, and IPR$_3$ during interval I are:

$$V_I \sin(\theta_I + 120°) + \sin \theta_I = V_I \sin(\theta_I + 60°)$$

$$V_I \sin(\theta_I - 120°) - \sin(\theta_I - 60°) = -V_I \sin \theta_I$$

As can be seen, these voltage form a balanced, three-phase set with phasors $V_I \angle -60°$, $V_I \angle 60°$ and $V_I \angle -180°$.

The above calculation repeated for the remaining time intervals gives similar expressions as follows:

|  | During Interval II: | |
|---|---|---|
|  | $V_I \sin(\theta_I + 60°)$, for IPR$_1$ | |
|  | $-V_I \sin \theta_I$, for IPR$_2$ | |
| and | $V_I \sin(\theta_I - 60°)$, for IPR$_3$; | |
|  | During Interval III: | |
|  | $-V_I \sin \theta_I$, for IPR$_1$ | |
|  | $V_I \sin(\theta_I - 60°)$, for IPR$_2$ | |
|  | $V_I \sin(\theta_I + 60°)$, for IPR$_3$; | |
|  | During Interval IV: | |
|  | IPR$_1$ | $V_I \sin(\theta_I - 60°)$, for IPR$_1$ |
|  | IPR$_2$ | $V_I \sin(\theta_I + 60°)$, for IPR$_2$ |
| and | IPR$_3$ | $-V_I \sin \theta_I$, for IPR$_3$; |
|  | During Interval V: | |
|  | $V_I \sin(\theta_I + 60°)$, for IPR$_1$ | |
|  | $-V_I \sin \theta_I$, for IPR$_2$ | |
| and | $V_I \sin(\theta_I - 60°)$, for IPR$_3$; | |
|  | During Interval VI: | |
|  | IPR$_1$ | $-\sin \theta_I$, for IPR$_1$ |
|  | IPR$_2$ | $\sin(\theta_I - 60°)$, for IPR$_2$ |
| and | IPR$_3$ | $\sin(\theta_I + 60°)$, for IPR$_3$. |

From the above it appears that the voltage across the three interphase reactors are sinusoidal and consist of sinusoidal segments which form a balanced three-phase set all the time. It is possible therefore to introduce three sinusoidal voltages $\alpha$, $\beta$ and $\gamma$ defined as follows:

$$= V_I \sin(\theta_I - 60°)$$

$$= -V_I \sin \theta_I$$

$$= V_I \sin(\theta_I + 60°)$$

and the operation of the UFC can be seen as having the same effect on the interphase reactors as if they were sequentially switched to voltages $\alpha$, $\beta$ and $\gamma$. This is illustrated in FIG. 4 by waveforms G, H and I. As shown, during interval I voltages $\alpha$, $\gamma$ and $\beta$ are applied to IPR$_1$, IPR$_2$ and IPR$_3$; during interval II voltages $\gamma$, $\beta$ and $\alpha$, during interval III voltage $\beta$, $\alpha$ and $\gamma$, are applied and so on for the successive time intervals.

From the above analysis it follows that the voltages appearing across the three interphase reactors IPR$_1$, IPR$_2$, and IPR$_3$ of the unrestricted frequency changer (UFC) of FIG. 1 form a balanced, three-phase system at any given time. It is evident that this property exists for a similar converter having a larger number of phases and a correlatively larger number of reactors.

The gist of the present invention is to make use of this unique property, as revealed in this particular arrangement for a UFC converter system, by mounting the windings of the three interphase reactors on a single three-limb magnetic core 10 of the type commonly used in a three-phase transformer design such as shown in FIG. 5, where the ampere-turns of the windings are all equal to $n$. As a result of such interphase reactor arrangement, 30% reduction in the weight of the magnetic core can be achieved and the losses in the iron are concurrently decreased. This is particularly advantageous in aircraft electrical systems, where the polyphase voltage source is derived from a generator driven by the engine of an airplane and a constant frequency alternating current is to be generated by frequency conversion with a minimum weight. Indeed, as hereabove stated, the same advantages can be derived with more than three interphase reactors, either while using magnetic cores having more legs in relation to the number of phases to be accommodated, or while using several multilegged core of the type described.

Although the preferred embodiment of the invention relates to a six-phase unrestricted frequency changer, it is understood that other frequency changers requiring the use of several interphase reactors can offer the same possibility of mounting several interphase reactors on a common magnetic core in accordance with the present invention, whenever while so doing the sum of the magnetic fields due to the respective windings at any given time remains constant throughout the magnetic core.

Figure 8:
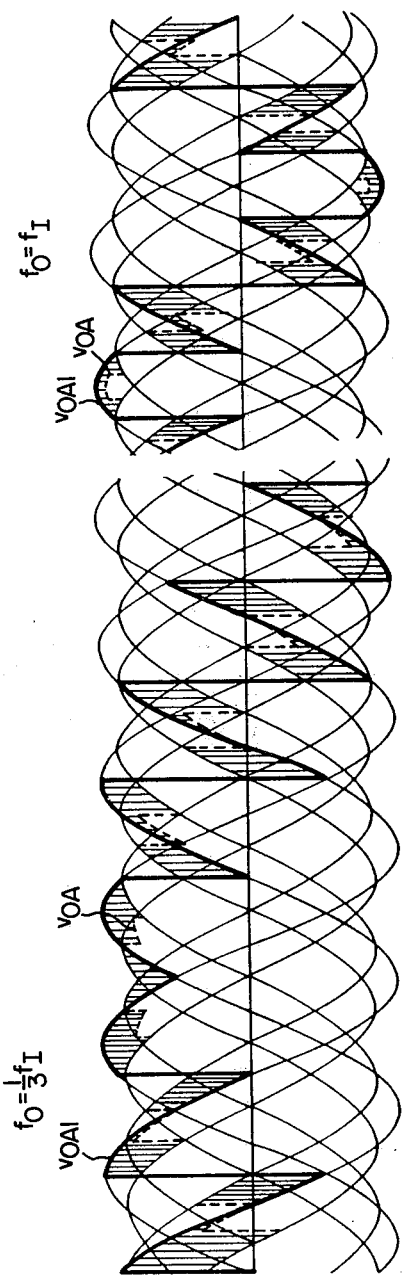
FIG. 8 is similar to FIG. 3 but applies to the frequency changer of FIG. 6 in relation to the voltage waveform of FIG. 7.
Figure 7:
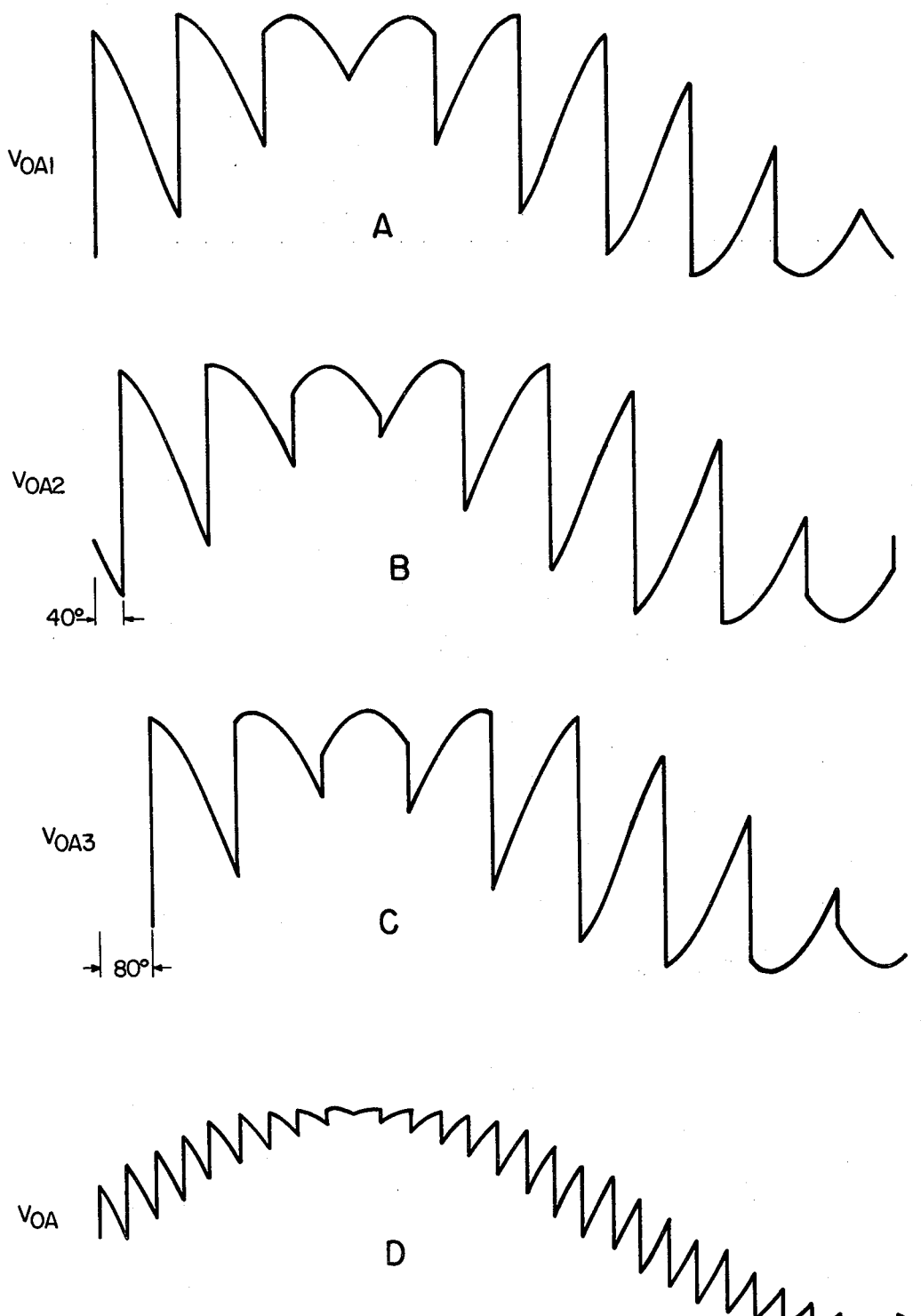
FIG. 7 illustrates voltage waveforms similar to those of FIG. 2 but in relation to the frequency changer of FIG. 6.

It has been shown that such condition is verified in a six-phase UFC. Referring to FIGS. 6 and 7, it can be shown that this is equally true for a nine-phase UFC. FIG. 6 shows the mounting of an interphase reactor relative to one output phase between three groups I, II, III banks of three bilateral switches instead of two groups, in the preferred embodiment. FIG. 7 represents the voltage waveforms at the inputs (three curves A, B, C) and at the output (curve D) for the interphase reactor of FIG. 6. The comments made regarding curves A and B of FIG. 2 equally apply to curves A, B and C of FIG. 7. Three currents, each carrying 1/3 of the total current, instead of two, are being combined in the common output for the three windings of the interphase reactor (IPR$_1$, IPR$_2$ or IPR$_3$) of FIG. 7. The volt-second product absorbed by each winding of the reactor is derived in the same fashion as for FIG. 3. The resulting curve is shown in FIG. 8 on the left side for a frequency ratio $f_o/f_I = 1/3$, on the right side for a frequency ratio of unity. When three reactors such as shown IPR$_I$, IPR$_2$, IPR$_3$ in FIG. 6 are combined on a common magnetic core for the three phases at the output of the nine-phase UFC, three curves similar to curves G, H, I of FIG. 4 can be drawn which add up in such a way that at any instant the sum of the voltage appearing across the windings of the three interphase reactors is zero. It is a matter of ordinary skill to design a multilegged core which can accommodate on a single core the functions of three-legged interphase reactors such as shown in FIG. 6.

What we claim is:
1. In frequency conversion apparatus wherein a plurality of bilateral power switching devices are operated in a repetitive switching pattern at a chosen repetition rate to apply successive increments of alternating voltages from a polyphase voltage source to supply at least three output terminals with current at an output frequency which is a function of the difference between the input frequency and said repetition rate, the combination of:
  at least three interphase reactor means respectively associated with said three output terminals, each of said interphase reactor means combining currents from two respective groups of said bilateral switching devices and having a center tap connected to a corresponding one of said three output terminals with said interphase reactor means being mounted on a common magnetic core.

* * * * *